United States Patent [19]

Mason

[11] Patent Number: 5,258,677
[45] Date of Patent: * Nov. 2, 1993

[54] PERMANENT MAGNET REPELLING FIELD DC MOTORS

[76] Inventor: Elmer B. Mason, 901 Vickie Dr., Del City, Okla. 73115

[*] Notice: The portion of the term of this patent subsequent to May 18, 2010 has been disclaimed.

[21] Appl. No.: 977,983

[22] Filed: Nov. 18, 1992

Related U.S. Application Data

[63] Continuation-in-part of Ser. No. 870,861, Apr. 20, 1992, Pat. No. 5,212,418.

[51] Int. Cl.$^5$ ............................................. H02K 16/02
[52] U.S. Cl. ..................................... 310/112; 310/114
[58] Field of Search ............... 310/114, 112, 124, 154, 310/40 MM, 126, 40.5, 152, 126

[56] References Cited

U.S. PATENT DOCUMENTS

| | | | |
|---|---|---|---|
| 881,585 | 3/1908 | Hopkinson et al. | 310/112 |
| 3,651,355 | 3/1972 | Mason | 310/112 |
| 3,717,780 | 2/1973 | Hohne, Jr. et al. | 310/112 |
| 3,863,084 | 1/1975 | Hasebe | 310/114 X |
| 4,316,109 | 2/1982 | Mason | 310/114 |

*Primary Examiner*—Steven L. Stephan
*Assistant Examiner*—E. To
*Attorney, Agent, or Firm*—Robert K. Rhea

[57] ABSTRACT

A permanent magnet motor having a plurality of armatures supported between magnetic pole pieces energized by one or more permanent magnets interposed between the magnetic pole pieces. Wiring and electrical current controls connect a DC source to the armature commutators for selectively operating the armatures at a predetermined rpm and providing a selected torque with a minimum of ampere drain from the DC source.

10 Claims, 6 Drawing Sheets

PERMANENT MAGNET REPELLING FIELD DC MOTORS

This application is a continuation-in-part of an application filed by me in the United States Patent and Trademark Office on Apr. 20, 1992 under Ser. No. 07/870,861 for High Torque and Speed Motors, now U.S. Pat. No. 5,212,418, issued May 5, 1993.

BACKGROUND OF THE INVENTION

1. Field of the Invention

This invention relates to direct current motors and more particularly to multi-armature motors having permanent magnets between parallel pole pieces establishing magnetic circuits for exciting an armature.

Conventional direct current motors usually comprise a housing journalling an armature with sectional field coils o stator windings contained by the housing which substantially surround the armature to provide a magnetic circuit for exciting the armature.

In this type of design only one armature is operated by each group of stators or field windings resulting in inefficient utilization of the various circuits established and thus limiting the potential of the magnetic circuit established by direct current through commutators of armatures interposed between magnetizable pole pieces.

The number of rotors which ma be interposed between and operated by the magnetic flux of two pole pieces established by one or more permanent magnets is almost unlimited as disclosed by this invention.

2. Description of the Prior Art

The most pertinent patents are believed to be my U.S. Pat. No. 3,651,355 issued to me on Mar. 21, 1972 for Multi-armature Motors and U.S. Pat. No. 4,316,099 issued to me on Feb. 16, 1982 for Permanent Magnet Stator For D.C. Motors.

My U.S. Pat. No. 3,651,355 discloses the basic features of the motors of this invention, but fails to discloses all the advantages of magnetic flux established by permanent magnets in selectively obtaining desired torque and speed of the respective armature with relation to efficient use of amperage as disclosed by this invention.

The other of my above named patents (#4,316,099) discloses one of the essential features of this invention, namely, the dimension of the respective pole piece arc in relation to the winding span of the armature and discloses a concentric armature rotating motor.

SUMMARY OF THE INVENTION

Direct current motors are formed by armatures interposed between parallel opposite polarity pole pieces magnetized by permanent magnets extending between the pole pieces.

Wiring and substantially conventional electrical controls connecting a direct current source with the armature commutators are selectively operated resulting in motors formed by respective armatures having high speed, high torque, low amperage input or low speed, low torque motors in which the direction of rotation is easily reversed by changing the direction of current through the brushes on the commutators or changing the position of the brushes on the commutator of the respective armature.

The principal object of this invention is to provide a series of direct current motors and/or generators which find high utilization in industry and for tools and appliance operation for nonindustrial users.

DESCRIPTION OF THE PREFERRED EMBODIMENTS

Like characters of reference designate like parts in those figures of the drawings in which they occur.

Figure 1:
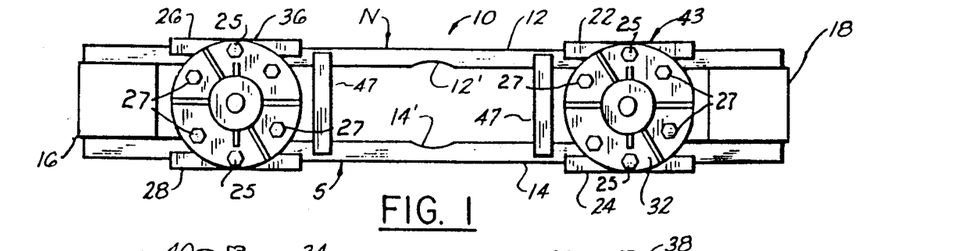
FIG. 1 is a side elevational view of one embodiment of a two armature DC motor.
Figure 2:
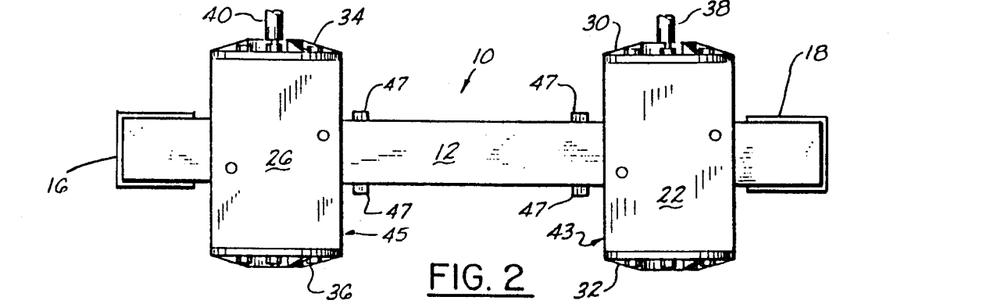
FIG. 2 is a top view of the motor of FIG. 1.

In the drawings:

Referring first to FIGS. 1 and 2, the reference numeral 10 indicates a dual armature direct current electric motor formed in accordance with this invention.

The motor 10 includes a pair of strap-like elongated spaced-apart magnetizable pole pieces 12 and 14 preferably formed from malleable iron and interconnected at their respective end portions by permanent magnets 16 and 18 having their respective like magnetic poles respectively bonded to the pole pieces 12 and 14 in magnetic flux conducting relation.

The magnets 16 and 18 are preferably industrial magnets manufactured from a selected magnetic material and presently available under the Trademarks or Tradename ALINCO #3, 4 or 5. The respective exposed side surface, or end surface not covered by one of the pole pieces, is surrounded by a protective layer or coat of nonmagnetic material to prevent disintegrating particles of the magnets falling into or being magnetically attracted to bearings, gears or into spaces between motor armatures and magnetic poles as presently described.

Each magnet 16 and 18 is substantially rectangular when viewed from either end (FIG. 2) for the reasons more fully explained hereinbelow.

Like poles of the magnets 16 and 18 are connected with the respective poles piece 12 and 14. The magnets 16 and 18 form north N and south S magnetic pole pieces of the respective members 12 and 14. Thus, pairs of like magnetic poles, for example two north poles, connected with the pole piece 12 end portions doubles the magnetic flux density medially the length of the pole piece 12.

Two pairs of rectangular nonmagnetic material motor housing plates 22-24 and 26-18 are transversely secured in cooperating parallel opposition to the outer surfaces of the magnetic pole pieces 12 and 14 adjacent the respective magnet 16 and 18.

Bearing equipped pairs of motor circular housing end plates 30-32 and 34-36 are respectively secured to the respective end portions of the pairs of plates 22-24 and 26-28 by bolts 25 and journal the respective armature shaft 38 and 40 of the pair of armatures 42 and 44 (illustrated fragmentarily by FIG. 4) and define motor assemblies 43 and 45, respectively. Other bolts 27 mount the commutator brushes and brackets, neither being shown, on the respective end plate 30-32 and 34-36 in a conventional manner.

Figures 6, 7, 8:
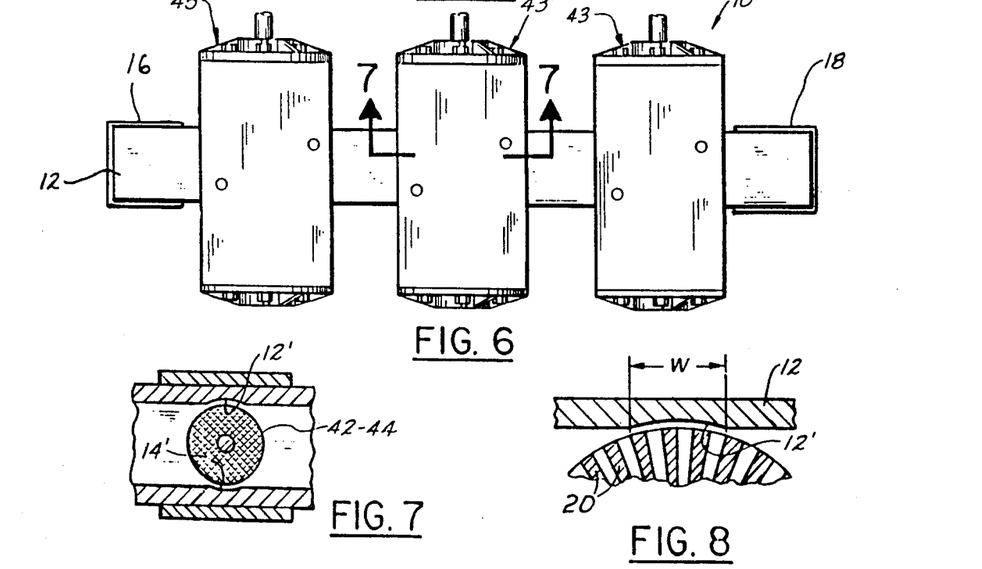
FIG. 7 is a vertical cross sectional view taken substantially along the line 7—7 of FIG. 6.
FIG. 8 is a fragmentary vertical cross sectional view, to a larger scale, similar to FIG. 7, illustrating the relationship of one magnetic pole piece relative to the periphery of an armature winding.
Figure 11:
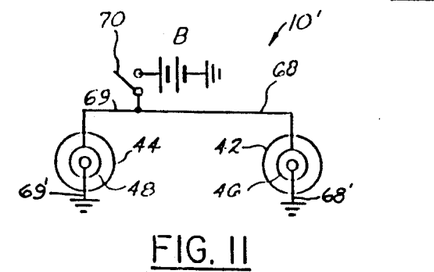
FIGS. 11, 12, and 13 are wiring diagrams for desired operating characteristics of a two armature DC motor.

Referring also to FIGS. 7 and 8, the armatures 42 and 44 are of the conventional slotted type, each having a commutator 46 and 48, respectively, diagrammatically illustrated by FIG. 11. The diameter of the respective armature 42 and 44 is slightly greater than the spacing between the magnetic pole pieces 12 and 14 for the reasons which will now be explained.

The magnetic pole pieces 12 and 14 are provided with transverse confronting concave recesses 12' and 14' (FIG. 1) which are cooperatively positioned in axial alignment with the respective armature 42 and 44, as illustrated by FIG. 7.

The preferred spacing between the periphery of the armature and the surface of the respective concave recess 12' and 14' is 0.020"+0.005" (0.051 cm +0.013 cm). The width (W) (FIG. 8) of the magnetic pole recesses 12' and 14' longitudinally of the pole pieces is preferably one-half the winding span of the respective armature. Stated another way, the recess width (W) is equal to the circumferential arc spanning three and one-half segments 20 of a span seven armature.

The width W of the recess 12' relative to the span of the armature is critical for the reason this width relation results in utilizing the favorable armature driving magnetic flux of the respective polarity which is concentrated in the respective recess from opposing directions in the respective pole piece without magnetic flux in the respective pole piece adjacent the recess 12' acting as a counterforce on the segments of the armature in opposition to its direction of rotation. This greatly improves the torque and speed of a direct current motor by eliminating magnetic counterforce acting on the armature.

The ease with which the operating characteristics of these motors may be changed, such as torque, speed or reversing as well as low amperage drag, through electrical controls, render these motors particularly useful in industry.

Figure 3:
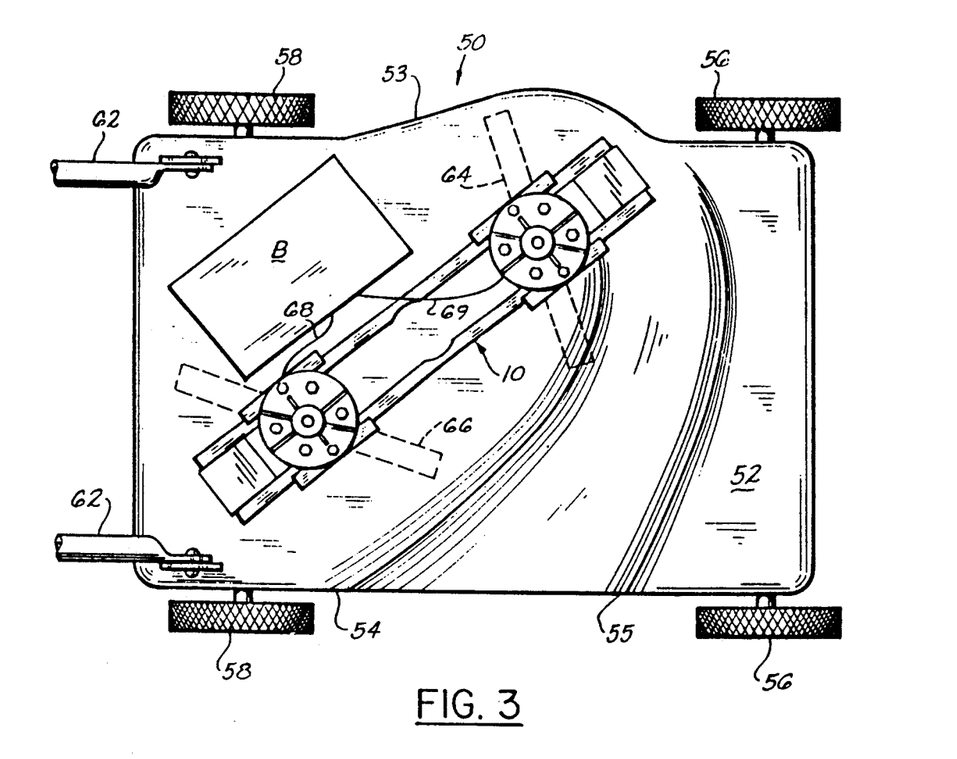
FIG. 3 is a fragmentary top view of a lawn mower having the motor of FIGS. 1 and 2 mounted thereon in operative position.
Figure 4:
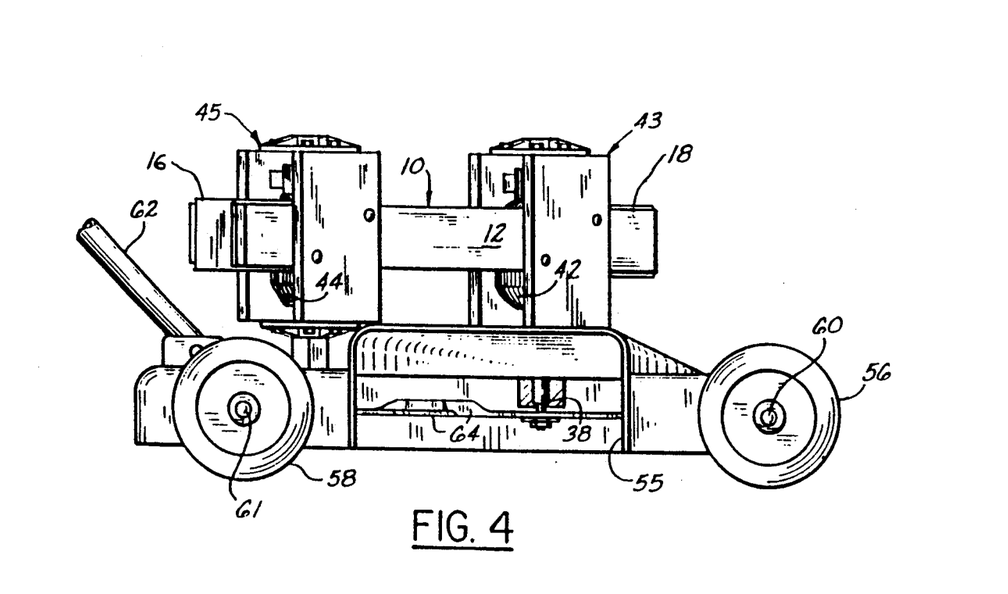
FIG. 4 is a side elevational view.

By way of example, FIGS. 3 and 4 illustrate the motor 10 mounted on and operating a residential-type lawn mower 50.

The lawn mower 50 comprises a housing, preferably formed from nonmagnetic material such as fiber glass, having a generally horizontal platform top surface 52 and downwardly depending side walls 53 and 54.

The side wall 54 is provided with a cut-grass exhaust opening 55 and the side walls 53 and 54 respectively support forward and rearward pairs of outboard wheels 56 and 58 on axles 60 and 61, respectively. A handle, shown fragmentarily at 62, connected with the rearward portion of the platform 52 permits the operator to manually push and guide the lawn mower 50.

The motor 10 is mounted on the mower platform 52 by extending the armature shafts 38 and 40 downwardly through suitable apertures formed in the mower platform 52 and connecting the respective armature shaft with conventional mower blades 64 and 66. A battery B, such as a DC lead acid battery, (FIG. 3) is conveniently mounted on the mower platform 52 and wires 68 and 69 connect the potential of the battery in parallel to one brush of a pair of brushes, neither being shown, on the respective armature commutator 46 and 48 of the motor 10 through conventional electric controls, not shown, mounted on the handle 62 including an off-on switch 70 (FIG. 11).

Referring also to FIG. 11, for mowing most vegetation with a residential-type lawn mower, the other brush of the pair of brushes on the respective commutator 46 and 48 is connected to ground by wires 68' and 69'.

Figure 12:
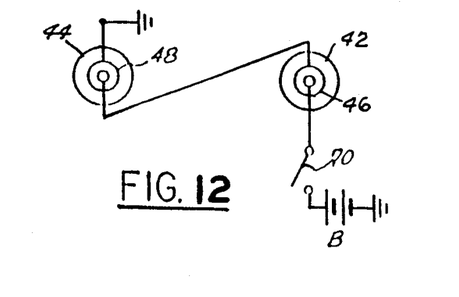

FIG. 12 illustrates the potential of the battery B connected to ground in series through the commutators 46 and 48 of the armatures 42 and 44, respectively. This wiring reduces the speed of both armatures 42 and 44.

Figure 5:
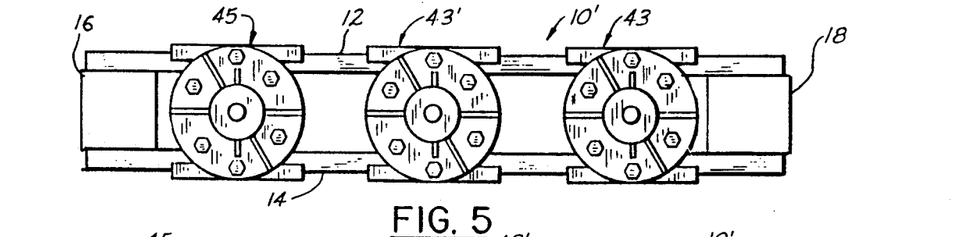
FIGS. 5 and 6 are views similar to FIGS. 1 and 2, respectively, having a third armature interposed between two armatures.

Referring also to FIGS. 5 and 6, in order to add a self-propelled feature to the lawn mower 50, a third motor assembly indicated at 43' similar to the motor assemblies 43 and 45 is centrally interposed between the magnetic pole pieces 12 and 14. The drive shaft of the motor assembly 43' is similarly extended downwardly through the motor platform 52 and connected with a selected drive train, such as belts and pulleys or gears, not shown, for angularly rotating the forward or rearward wheels of the lawn mower 50.

Magnetic flux from the permanent magnets 16 and 18 centrally concentrating in opposition between the respective pole pieces 12 and 14 and motor assemblies 43 and 45 provides ample magnetic flux for driving the armature of the motor assembly 43'.

Figure 14:
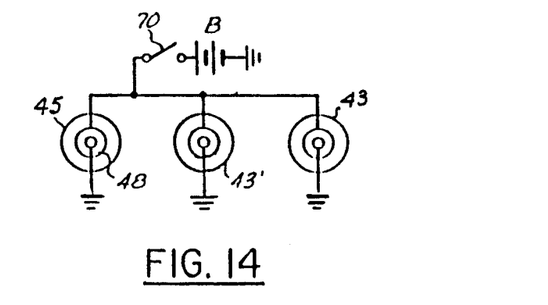
FIGS. 14 and 15 are wiring diagrams for the motor illustrated by FIGS. 5 and 6.
Figure 15:
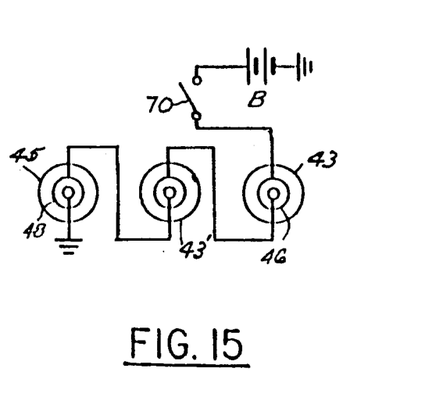

The wiring diagrams for the self-propelled mower motor 10' is illustrated by FIGS. 14 and 15 for the respective parallel and series connections of the commutators of the motor assemblies 43, 43', and 45.

Figure 9:
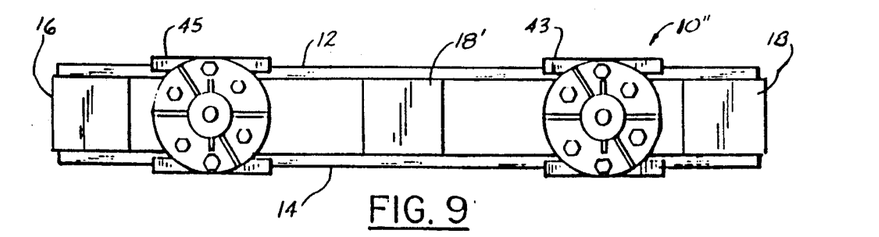
FIGS. 9 and 10 are views similar to FIGS. 1 and 2, respectively, illustrating a third magnet interposed between the armatures.
Figure 10:
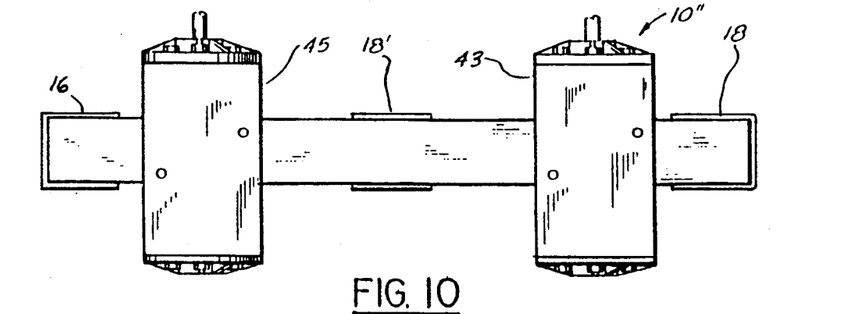

Referring more particularly to FIGS. 9 and 10, a third embodiment of the motor is indicated at 10" and features a third permanent magnet 18', identical with either of the magnets 16 or 18, centrally interposed between the magnetic pole pieces 12 and 14. The added third magnet 18' further increases the magnetic flux in the pole pieces 12 and 14 and connecting the battery potential to ground in series through the respective commutator 46 and 48, as in FIG. 12, results in a free-running low amperage drag motor in which the amperage drag increases with load.

Figure 9A:
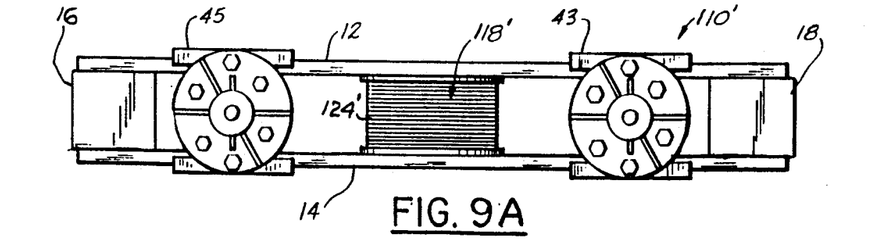
FIGS. 9A and 10A are views similar to FIGS. 9 and 10, respectively, illustrating a coil interposed between the armatures and pole pieces.
Figure 10A:
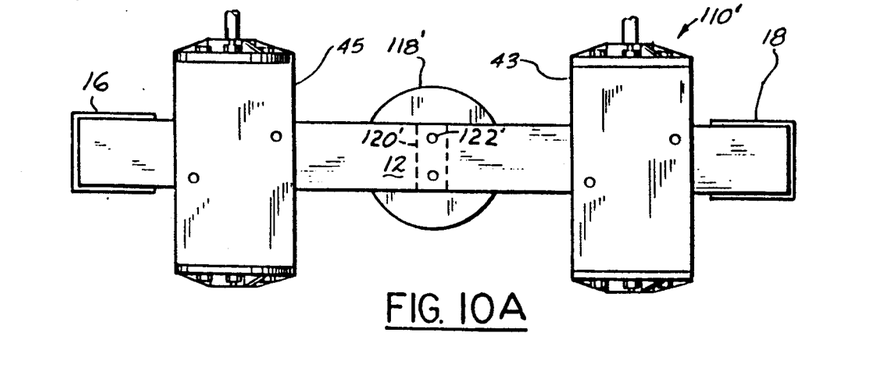

Referring also to FIGS. 9A and 10A, a further embodiment of the motor 10" is indicated at 110' in which the centrally disposed permanent magnet 18' is replaced by a coil 118'. The coil 118' comprises a metallic coil core 120' extending between the pole pieces 12 and 14 and secured thereto by bolts or screws 122'.

A wire or wires 124' are wrapped around the rectangular coil core 120'. The purpose of the coil 118' is to further increase the magnetic flux in the pole pieces 12 and 14 and on the armatures for increasing the torque of these motor assemblies 43 and 45.

Figure 13:
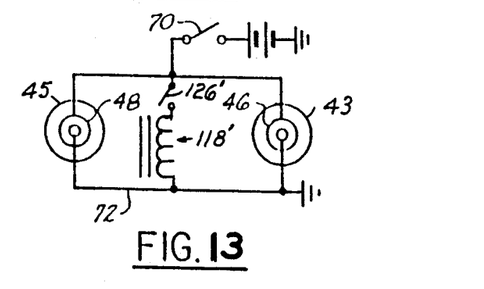

FIG. 13 illustrates the wiring for the motors of FIGS. 9A and 10A in which connecting the battery potential to ground in parallel with the respective armature 46 and 48 and coil 118' through a coil switch 126', in addition to the on-off starting switch 70, adds the battery powered flux of the coil 118' to the permanent magnet flux in the pole pieces 12 and 14. The north and south poles generated by battery potential through the coil wires must be cooperative with the polarity of the permanent magnets 16 and 18, to avoid reversing the polarity of the latter.

As an example of the useful feature of the coil 118', when the motor 110' is mounted on the lawn mower 50 the coil switch 126' may be left open until such time as heavy vegetation is encountered which requires additional torque from the motor assemblies 43 and 45. The switch 126' may then be manually closed to obtain increased power.

Figure 16:
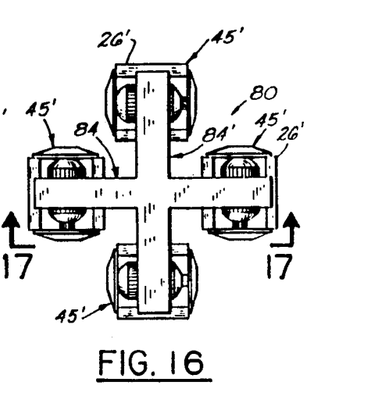
FIG. 16 is a top view of another DC motor embodiment.
Figure 17:
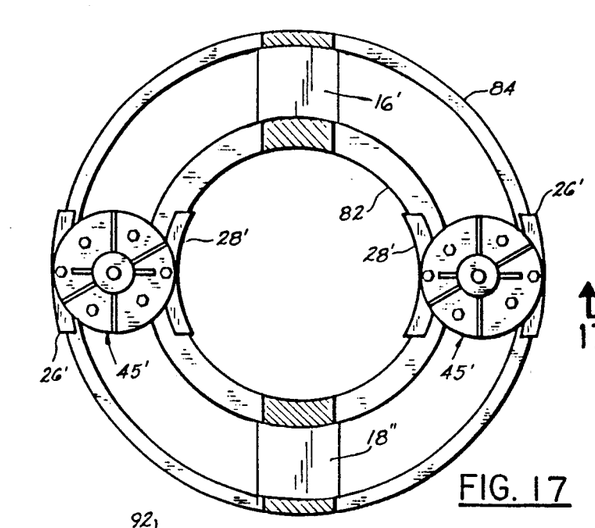
FIG. 17 is a vertical cross sectional view, mostly in elevation, taken substantially along the line 17—17 of FIG. 16.

Referring now more particularly to FIGS. 16 and 17, a circular array of the motor assembly is illustrated at 80 which is formed by two pairs of endless inner and outer concentric pole pieces, respectively integrally connected in crossed relation. Transversely each endless pole piece is substantially equal to the transverse width of the pole pieces 12 and 14 and the spacing therebetween is substantially equal to the spacing between the pole pieces 12 and 14. The respective inner pole piece 82 and 82' is provided with additional thickness so that the mass of the inner and outer pole pieces 82, 82' and 84-84' are, respectively, substantially equal for reasons well understood by those familiar with direct current magnetic motors.

A pair of permanent magnets, indicated at 16' and 18", extend between the inner and outer pole pieces at their respective intersections, substantially identical with respect to the permanent magnets 16 and 18, and in diametric opposition between the respective pairs of pole pieces. The central area within the innermost pole pieces is referred to as a "calm area" or "eye" of the motor assembly 80 when not more than two magnets are disposed between the pairs of pole pieces 82-82', and 84-84'.

Similarly, a pair of motor assemblies 45' substantially identical with respect to the motor assembly 45 with the exception of its housing plates 26' and 28', which are arcuately curved transversely to cooperate with the circular arc of the respective pole piece, support the respective armature shaft of the respective motor assembly 45' in diametric opposition and spaced 90° from the respective magnet.

Obviously either pair of the crossed pairs of endless concentric pole pieces of FIG. 16 may be expanded as a multi-motor assembly.

Figure 18:
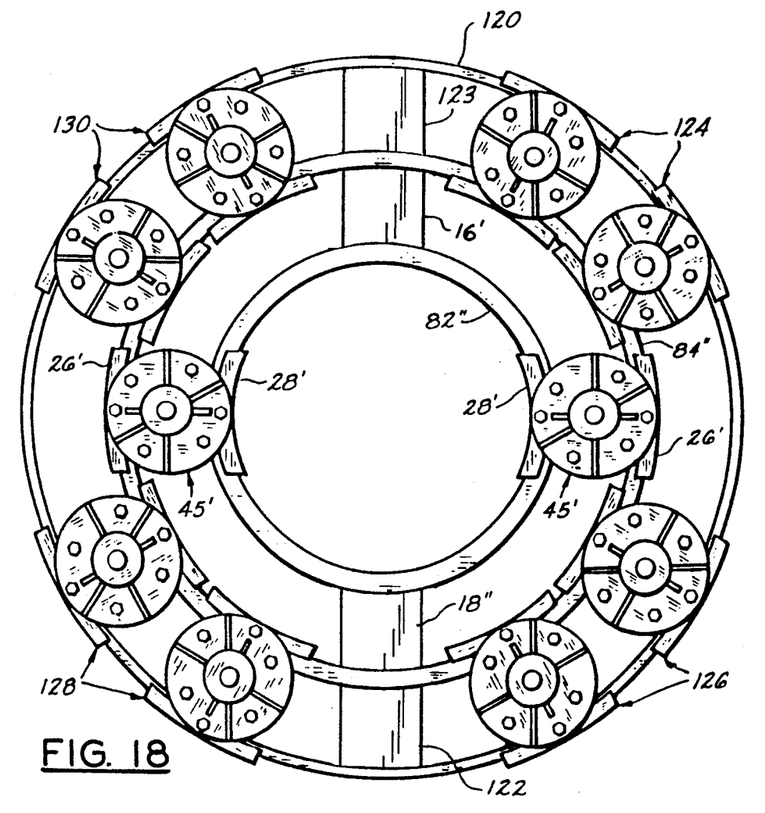
FIG. 18 is a side view of another DC motor embodiment.

FIG. 18 illustrates an example of such a motor in which the inner and outer concentric pole pieces 82" and 84" are connected in similar spaced-apart relation by the magnets 18" and 19' and a pair of the motor assemblies 45' are disposed in diametric opposition spaced 90° from the respective magnets 16' and 18". This motor assembly comprising the inner and outer concentric rings 82" and 84", magnets 16' and 18" and a pair of motor assemblies 45' can be further expanded outwardly by adding a third endless pole piece 120 concentric with the pole pieces 82" and 84" and radially spaced from the outer pole piece 84" a distance substantially equal to the spacing between the pole pieces 82" and 84".

The outer pole piece 120 is rigidly connected with the pole piece 84" by additional permanent magnets 122 and 123 identical with the magnets 16' and 18" and respectively positioned in diametric alignment therewith.

A plurality of pairs of motor assemblies 124, 126, 128 and 130 are interposed between the pole piece 84" and outer pole piece 120 in a manner similar to that described hereinabove for the motors 45'.

Figure 19:
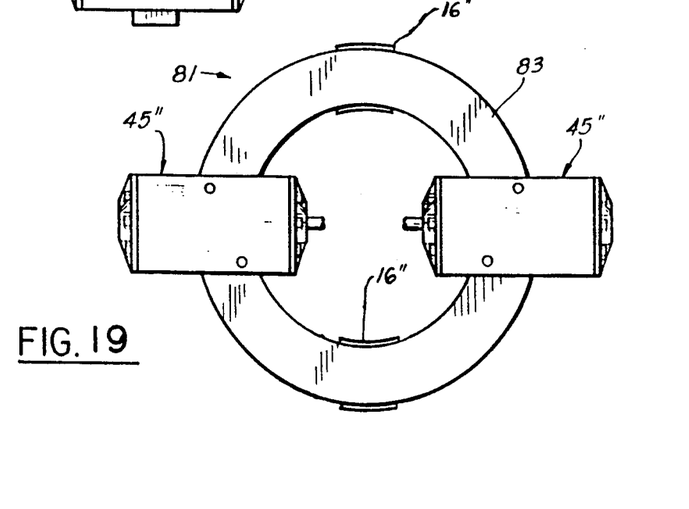
FIGS. 19, 20, and 21 are top views, respectively, of other DC motor embodiments.

Referring now more particularly to FIG. 19, a circular array of the motor assembly is illustrated at 81 which is formed by a pair of endless pole pieces 83, only one being shown. Transversely each pole piece 8 is substantially equal to the transverse width of the pole pieces 12 and 14 and the spacing therebetween is substantially equal to the spacing between the pole pieces 12 and 14.

A pair of permanent magnets, indicated at 16", substantially identical with respect to the magnet 16, extend between the respective inner and outer pole pieces in diametric opposition between the pole pieces 83.

Similarly, a pair of motor assemblies 45" substantially identical with respect to the motor assembly 45 support the respective armature shaft of the respective motor 45".

Obviously additional magnets and/or motor assemblies may be interposed between the pole pieces of the motors 80 and 81 (FIGS. 16-19) for particular motor requirements. The wiring diagram of these endless pole piece motors is substantially identical with the diagrams of FIGS. 11 and 12.

Another version of the three armature motor is indicated at 86 (FIG. 20) in which the pole pieces 88 an 90 are similar to the pole pieces 12 and 14 and respectively receive between their respective end portions, a pair of motor assemblies 92, respectively identical with the motor assemblies 43 and 45.

Figure 20:
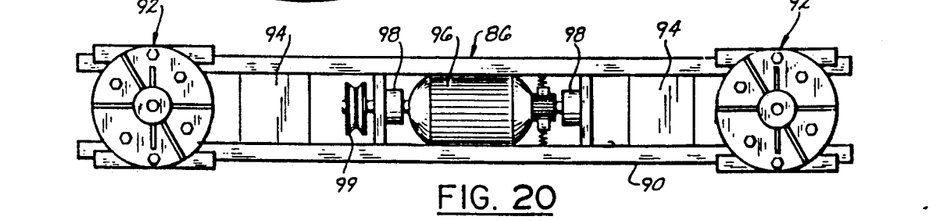

A pair of permanent magnets 94 are interposed between the pole pieces 88 and 90 adjacent, but inwardly of the respective motor assembly 92. Between these two magnets 94, a third armature 96 is longitudinally interposed between the pole pieces 88 and 90 with its shaft in axial alignment with the longitudinal axis of the pole pieces 88 and 90. The shaft of the armature 96 is journalled at its respective end portions by suitable nonmagnetic bearing supports 98, extending between and secured to the pole pieces 88 and 90. A pulley or sprocket 99 may be connected with the drive shaft end of the armature 96.

Figure 21:
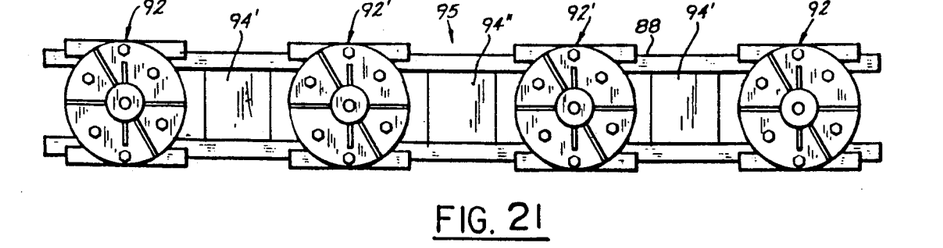

Another motor version similar to the motor 86 is indicated at 95 (FIG. 21) in which the central armature is omitted and additional motor assemblies indicated at 92' are interposed in spaced-apart relation between permanent magnets 94'. A third permanent magnet 94" is interposed between the central pair of motor assemblies 92'.

Figure 22:
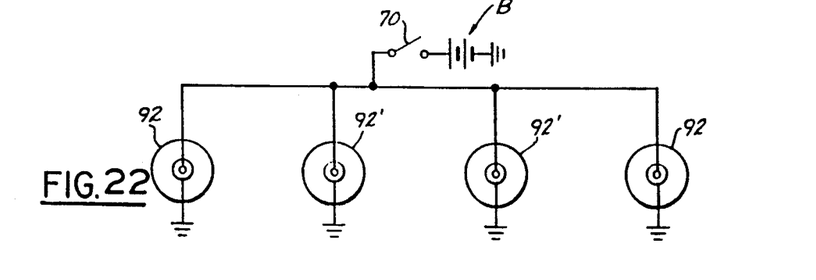
FIG. 22 is a wiring diagram for the motor illustrated by FIG. 21.

As illustrated by FIG. 22, the battery potential is connected to ground in parallel through the commutators of the motor assemblies 92 and 92'. With the motor 95 wired in this manner the outboard motor assemblies (or all of the motor assemblies) may be utilized as generators.

All of the above motors in which a permanent magnet is interposed between elongated parallel pole pieces generate an excess of magnetic flux forming opposing polarity magnetic pole pieces in which remote ends of the magnetic pole pieces contain sufficient, normally unused, magnetic flux to drive one or more additional motor assemblies.

As briefly mentioned hereinabove, the respective square or rectangular permanent magnet forms pairs of parallel opposing surfaces or sides and the juncture of one of the sides with an adjacent side forms a "corner portion" of the magnet in which the magnetic "working" flux may drive the armature of a motor assembly.

Figure 23:
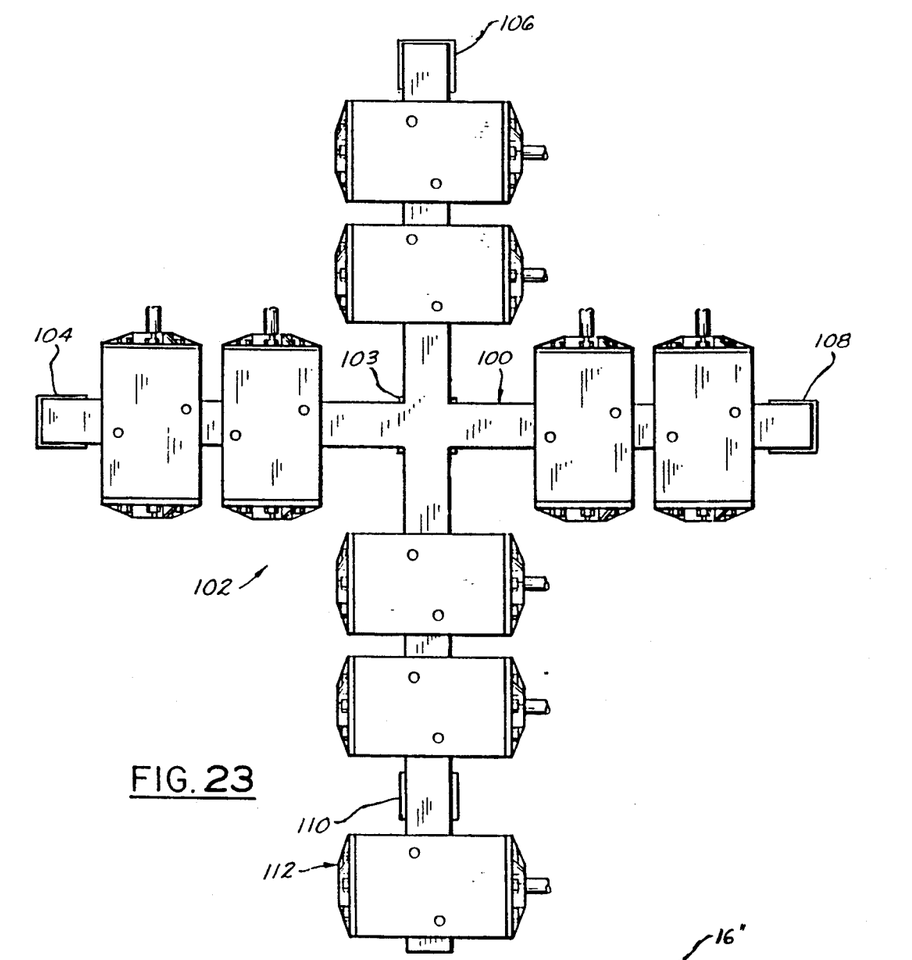
FIG. 23 is a top view of a further embodiment of DC motors.

FIG. 23 illustrates this feature in which a pair of pole pieces 100 are integrally joined in right angular crossed relation, only one being shown, are disposed in parallel superposed relation to form a multi-armature motor assembly, indicated at 102, which includes a central permanent magnet 103 and outboard permanent magnets 104, 106, and 108 at each of three of its remote pole piece end portions of the cross shape disposed outwardly of dual armature motor assemblies, similar to the motor 10.

The fourth arm of the cross shape similarly supports dual armature motor assemblies inboard of a fourth permanent magnet 110 with an additional motor assembly 112 disposed outwardly of the magnet 110.

Thus it may be seen that additional armature motor assemblies may be extended indefinitely, if space permits, from each of the arm end portions or "open ends" of the magnetic crossed pole pieces or at any "corner portion" of a permanent magnet.

Similarly additional planar pole pieces may be added in over or underlying relation to the planar pole piece motors or adding circular pole pieces to the circular motor (FIGS. 16–19) and interposing permanent magnets and motor assemblies between the added and original pole piece as needed for particular applications.

Obviously the invention is susceptible to changes or alterations without defeating its practicability. Therefore, I do not wish to be confined to the preferred embodiment shown in the drawings and described herein.

I claim:

1. A DC motor assembly, comprising:
   a pair of strap-like magnetizable metallic members disposed in parallel spaced-apart relation;
   net means between and connected with said members for forming a pair of magnetic pole pieces,
   each magnetic pole of said pair of pole pieces having a north and a south pole,
   said magnet means having opposing end surfaces abutting confronting surfaces of said pair of pole pieces adjacent their respective end portions and having opposite planar side surfaces parallel with the longitudinal side and end surfaces, respectively, of said pole pieces,
   said magnet side surfaces defining a like plurality of magnetic flux substantially planar surfaces disposed in a like plurality of planes normal to each other and the planes of the adjacent confronting surfaces of each pole piece of said pair of pole pieces,
   each pole piece of said pair of pole pieces having a transverse concave recess adjacent the respective said magnet means disposed in confronting opposition with a like cooperating concave recess in the opposite pole piece;
   first and second armatures each having a commutator and having a predetermined winding span transversely disposed in parallel spaced-apart relation between said pole pieces in axial alignment with the pole piece confronting recesses and forming a fine air gap between a peripheral portion of the respective armature and the surface defining the adjacent concave recess in the respective said pole piece of said pair of pole pieces,
   the width of the respective recess longitudinally of each pole of said pair of pole pieces being substantially one-half the winding span of the respective armature;
   nonmagnetic housing means for operatively supporting said armatures between said pair of pole pieces;
   a source of DC potential;
   primary circuit means including parallel primary wiring respectively connecting the DC potential to ground in series or parallel through the armature commutators for utilizing the magnetic flux influence from opposing directions in the respective pole pieces of said pair of pole pieces and in diametric opposition on the respective armature; and,
   control means including first switch means interposed in said primary wiring for selectively controlling the direction of rotation, angular rate of rotation, torque and amperes of one said armature relative to the other said armature.

2. The motor assembly according to claim 1 in which the radial dimension of the fine air gap is not less than 0.015" or greater than 0.025" (0.04 to 0.06 cm).

3. The motor assembly according to claim 1 in which the respective pole piece of the pair of magnetic pole pieces is strap-like and further include:
   a second pair of strap-like pole pieces having the respective pole piece of the second pair of pole pieces transversely intersecting intermediate its ends in coplanar angular relation the respective pole piece of the first named pair of pole pieces intermediate their respective ends; and,
   other armatures interposed between said first and said second pairs of pole pieces.

4. The motor assembly according to claim 1 and further including:
   secondary circuit means comprising a coil interposed and connected between said pole pieces and secondary wiring and a second switch means connecting the DC potential to ground through said coil in parallel with said commutators for doubling the magnetic flux influence on said armatures and doubling the torque of the armatures.

5. A DC motor assembly, comprising:
   a pair of strap-like magnetizable metallic members disposed in parallel spaced-apart relation;
   magnet means including a permanent magnet between and connected with said members for forming a pair of magnetic pole pieces,
   each magnetic pole piece of said pair of pole pieces having a north pole and a south pole,
   said magnet having opposing end surfaces abutting confronting surfaces of said pair of pole pieces and having opposite planar side surfaces parallel with the longitudinal side and end surfaces, respectively, of said pole pieces,
   said magnet side surfaces defining a like plurality of magnetic flux substantially planar surfaces disposed in a like plurality of planes normal to each other and the planes of the adjacent confronting surfaces of each pole piece of said pair of pole pieces,
   each pole piece of said pair of pole pieces having a transverse concave recess adjacent said magnet disposed in confronting opposition with a like cooperating concave recess in the opposite pole piece;

an armature having a commutator and having a predetermined winding span transversely disposed in parallel spaced-apart relation between said pole pieces in axial alignment with the pole piece confronting recesses and forming a fine air gap between a peripheral portion of the respective armature and the surface defining the adjacent concave recess in the respective said pole piece of said pair of pole pieces, the width of the respective recess longitudinally of each pole piece of said pair of pole pieces being substantially one-half the winding span of the armature;

nonmagnetic housing means for operatively supporting said armature between said pair of pole pieces;

a source of DC potential;

primary circuit means including primary wiring connecting the DC potential to ground through the commutator of said armature for utilizing the magnetic flux influence from opposing directions in the respective pole piece of said pair of pole pieces and in diametric opposition on the armature; and, control means including first switch means interposed in said primary wiring for selectively controlling the direction of rotation, angular rate of rotation, torque and amperes of said armature.

6. The motor assembly according to claim 5 in which the
respective pole piece of the pair of magnetic pole pieces is strap-like and further include:

a second pair of strap-like pole pieces having the respective pole piece of the second pair of pole pieces transversely intersecting intermediate its ends in coplanar angular relation the respective pole piece of the first named pair of pole pieces intermediate their respective ends; and, other armatures interposed between said first and second pairs of pole pieces.

7. The motor assembly according to claim 5 and further including:

secondary circuit means comprising a coil interposed and connected between said pole pieces and secondary wiring and a second switch means connecting the DC potential to ground through said coil in parallel with said commutator for doubling the magnetic flux influence on said armature and doubling the torque of the armature.

8. A DC motor assembly, comprising:

a pair of endless strap-like magnetizable members disposed in coaxial spaced-apart relation;

magnet means between and connected in diametric opposition with said members for forming a pair of opposite polarity magnetic pole pieces, each said magnetic means comprising, a rectangular permanent magnet having opposing end surfaces abutting confronting surfaces of said pair of pole pieces and having opposite planar side surfaces normal to the confronting surfaces, respectively of said pole pieces, each said magnet side surfaces defining a like plurality of magnetic flux generating substantially planar surfaces disposed in a like plurality of planes normal to each other and the adjacent confronting surfaces of each pole piece of said pair of pole pieces;

each pole piece of said pair of pole pieces having a transverse concave recess angularly spaced from the respective said magnet means and disposed in confronting opposition with a like cooperating concave recess in the opposite pole piece;

first and second armatures each having a commutator and predetermined winding span transversely disposed in parallel diametric opposition between said pole pieces in axial alignment with the pole piece confronting recesses and forming a fine air gap between a peripheral portion of the respective armature and the surface defining the adjacent concave recess in the respective said pole piece of said pair of pole pieces, the width of the respective recess circumferentially of each pole piece of said pair of pole pieces being substantially one-half the winding span of the respective armature;

nonmagnetic housing means for operatively supporting said armatures between said pair of pole pieces;

a source of DC potential;

primary circuit means including parallel primary wiring respectively connecting the DC potential to ground in series or parallel through the armature commutators for utilizing the magnetic flux influence from opposing directions in the respective pole pieces of said pair of pole pieces and in diametric opposition on the respective armature; and, electrical current control means including first switch means interposed in said primary wiring for selectively controlling the direction of rotation, angular rate of rotation, torque and amperes of one said armature relative to the other said armature.

9. The motor assembly according to claim 8 in which the respective pole piece of the pair of magnetic pole pieces is endless strap-like and concentric with the other pole piece and further including:

a second pair of endless concentric strap-like pole pieces having the respective pole piece of the second pair of pole pieces transversely diametrically intersecting in coplanar angular relation the respective pole piece of the first named pair of pole pieces, and, other armatures interposed between said second pair of endless concentric pole pieces.

10. The motor assembly according to claim 8 in which the respective pole piece of the pair of magnetic pole pieces is endless strap-like and concentric with the other pole piece and further including:

a third endless strap-like pole piece concentrically surrounding said pair of endless concentric pole pieces in radially spaced relation;

other magnet means interposed between and connecting said third pole piece with the outermost pole piece of said pair of concentric pole pieces; and, additional armatures interposed between said third pole piece and the outermost pole piece of said pair of concentric pole pieces.

* * * * *